United States Patent
Schweinberg et al.

(10) Patent No.: US 10,256,616 B1
(45) Date of Patent: Apr. 9, 2019

(54) SELF CENTERING ENCLOSURE

(71) Applicant: MacLean Power, L.L.C., Fort Mill, SC (US)

(72) Inventors: F. Matthew Schweinberg, Knoxville, TN (US); Jeff S. Zager, Loudon, TN (US); Ross Jette, Lenoir City, TN (US); Raymond L. Ellington, Sweetwater, TN (US)

(73) Assignee: MACLEAN POWER, L.L.C., Fort Mill, SC (US)

( * ) Notice: Subject to any disclaimer, the term of this patent is extended or adjusted under 35 U.S.C. 154(b) by 0 days.

(21) Appl. No.: 15/898,867

(22) Filed: Feb. 19, 2018

(51) Int. Cl.
*H02G 9/10* (2006.01)

(52) U.S. Cl.
CPC .................................. *H02G 9/10* (2013.01)

(58) Field of Classification Search
None
See application file for complete search history.

(56) References Cited

U.S. PATENT DOCUMENTS

| | | | | |
|---|---|---|---|---|
| 3,435,124 A | * | 3/1969 | Channell | H02G 15/068 |
| | | | | 174/17 R |
| 6,455,772 B1 | * | 9/2002 | Leschinger | H02G 9/10 |
| | | | | 174/38 |
| 7,569,768 B2 | * | 8/2009 | Maloney | H02G 3/0493 |
| | | | | 174/38 |
| 7,728,224 B2 | * | 6/2010 | Maloney | H02B 1/50 |
| | | | | 174/37 |
| 2005/0103780 A1 | * | 5/2005 | Maloney | H02G 9/10 |
| | | | | 220/4.02 |

* cited by examiner

*Primary Examiner* — Dimary S Lopez Cruz
(74) *Attorney, Agent, or Firm* — Brinks Gilson & Lione

(57) ABSTRACT

Enclosures are disclosed for use in underground applications. The enclosures include walls with end portions that are angled outward with respect to a middle of the wall such that the enclosures can be stacked on top of one another despite a draft angle of the walls. The bottom corners of the enclosures are aligned with a top surface of the enclosure to allow stacking. The enclosures include an opening in the bottom such that when multiple enclosures are stacked on top of one another, the enclosures for a single larger enclosure that can be used in underground applications.

20 Claims, 4 Drawing Sheets

SELF CENTERING ENCLOSURE

BACKGROUND

The present invention relates generally to enclosures and more particularly to underground enclosures.

Underground enclosures are used for a variety of applications, for example, splicing cable, housing slack cable, and housing meters. Enclosures can be made from a variety of materials such as HDPE, polypropylene, concrete, polymer concrete and fiberglass. Polymer concrete enclosures are manufactured using a gravity cast process that utilizes matched surface tooling with a predetermined draft. The draft makes the enclosures smaller on one end versus the other end, which makes the enclosure able to slide out of the mold. Some molds are designed with outside shells that hinge open, but the interior is still manufactured with a core that has a taper. A single piece shell is most desirable as it produces enclosures with the least amount of discontinuities in the reinforcement.

FIGS. 1-3 show a previously available enclosure 10 with exemplary dimensions. Other size and depth enclosures are also available. FIG. 1 shows a cut-away isometric view of enclosure 10. Lid 12 is located in the top opening 14. Bottom opening 16 is located opposite top opening 14. Enclosure 10 includes walls 18 with a foot 20 located at the bottom of walls 18. Foot 20 extends from walls 18 toward bottom opening 16. Walls 18 include a draft angle. FIG. 2 shows a top view of enclosure 10 with exemplary dimensions for top opening 14 and bottom opening 16. Top opening 14 is larger than bottom opening 16 due to the draft of walls 18 and foot 20. FIG. 3 shows a side view of enclosure 10 with wall 18. Enclosure 10 has a depth of 24".

Users of enclosures may need a deeper enclosed space than the depth on a specific enclosure. To achieve the required enclosed space, users may stack multiple enclosures on top of one another to achieve the desired depth. This can be accomplished by some previously available enclosures, but the users are limited by the draft angle required to remove the enclosures from a mold during the manufacturing processes of the enclosures. As discussed, the draft angle makes the enclosures smaller on one end versus the other end, which results in the inability to stack enclosures if the smaller end (bottom) of the top enclosure is smaller than the opening of the bottom enclosure. If the smaller end (bottom) of the top enclosure is smaller than the opening of the bottom enclosure, the top enclosure will fall through the opening in the bottom enclosure. Deeper enclosures have a greater difference in the sizes of the top and bottom ends due to the influence of the draft angle. Accordingly, only certain enclosure depths can be stacked on top of one another.

SUMMARY

In one embodiment, an enclosure comprises a top surface, a bottom surface, and a plurality of walls connecting the top surface and bottom surface. The plurality of walls includes a first wall and a second wall. The first wall and second wall each have a first end, a second end, and a middle adjacent to the first end and the second end. A portion of the first end of the first wall is disposed outwardly at a first angle from the middle of the first wall. A portion of the second end of the second wall is disposed outwardly at a second angle from the middle of the second wall.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS

Figure 1:
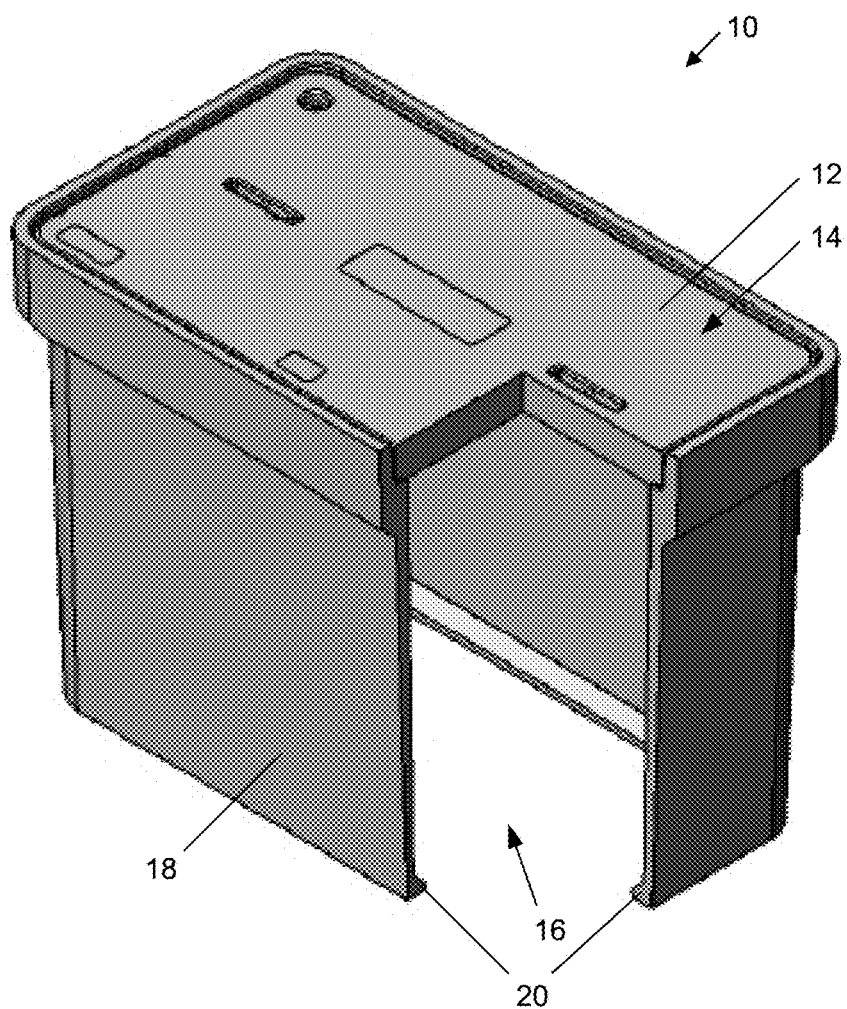
FIG. 1 is a cut-away isometric view of a prior art enclosure.
Figures 2, 3:
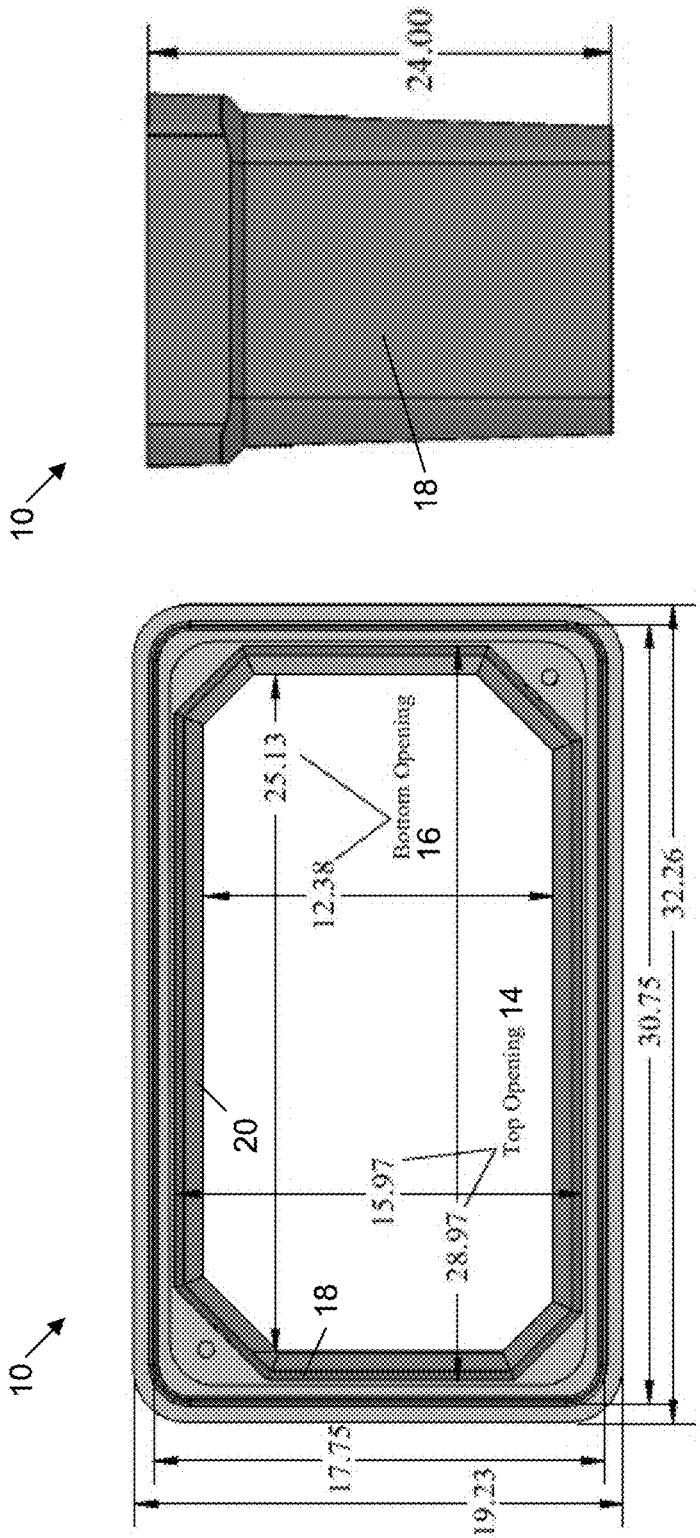
FIG. 2 is a top view of the prior art enclosure.
FIG. 3 is a side view of the prior art enclosure.
Figure 4:
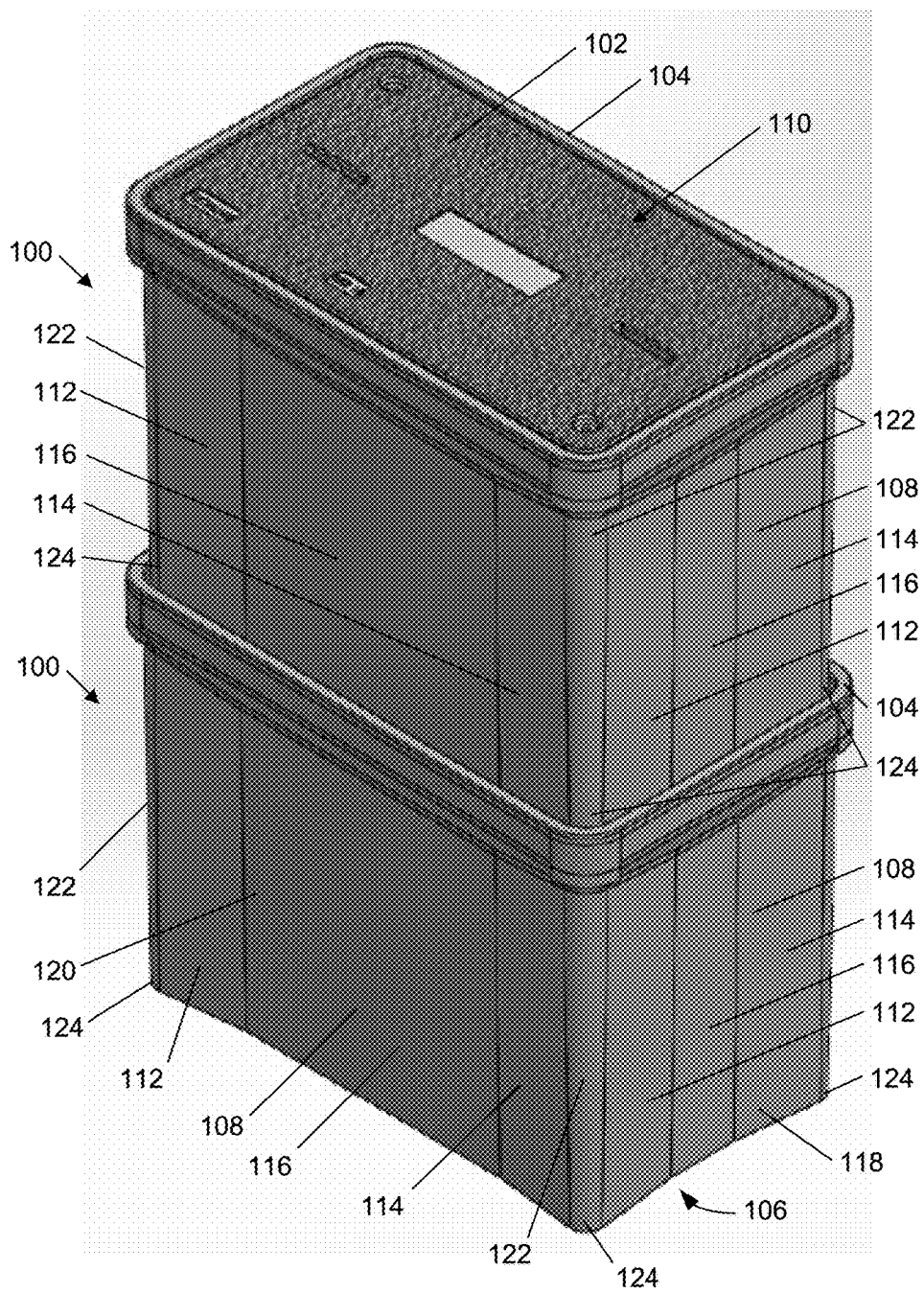
FIG. 4 is a isometric view of enclosures according to an embodiment of this disclosure.

Referring to the figures, FIG. 4 shows an isometric view of two enclosures 100 stacked on top of one another. Enclosure 100 may be an underground concrete enclosure. Enclosure 100 may be formed through a molding process. The enclosure 100 on top includes lid 102. Enclosure 100 may include a top surface 104, a bottom surface 106 (see FIG. 6), and walls 108. Top surface 104 may include a top opening 110. Lid 102 is located within top opening 110 in FIG. 4. Bottom surface 106 may include a bottom opening 132 (see FIG. 6). Bottom opening 132 may allow access to an enclosure 100 on the bottom when two enclosures 100 are stacked on top of one another.

Walls 108 may connect the top surface 104 to the bottom surface 106. Each wall 108 may include three portions, a first end portion 112, a second end portion 114, and a middle portion 116. Middle portion 116 may be located between end portions 112, 114. The size of each end portions 112, 114 and middle portion 116 of each wall 108 may vary. For example, the middle portion 116 of end wall 118 may be smaller than the middle portion 116 of sidewall 120. Similarly, the end portions 112, 114 of end wall 118 may be different sizes than the end portions 112, 114 of sidewall 120.

Walls 108 may connect at edges 122. Walls 108 may include a draft angle with respect to top surface 104 and bottom surface 106 such that walls 108 are not exactly vertical in relation to top surface 104 and bottom surface 106. The draft angle may aid in removing enclosure 100 from a mold. The draft angle may vary within a wall 108 such that the draft angle is not the same throughout the entire wall 108. The draft angle may be larger at the top or bottom of the wall. Additionally or alternatively, the draft angle may be larger or smaller at the end or middle portions of the wall.

Some or all end portions 112, 114 may be angled with respect to the middle portion 116 that the end portion 112, 114 is attached to. For example, end portions 112, 114 of end wall 118 may be disposed at an angle with respect to middle portion 116 of end wall 118. Put another way, each end portion 112, 114 may not be parallel or coplanar with the middle portion 116 that the end portion 112, 114 is attached to. The angle of end portions 112, 114 may be outward with respect to an interior of enclosure 100. Each end portion 112, 114 may be angled at the same angle or at a different angle than any other end portion 112, 114.

Angling end portions 112, 114 outward may result in edges 122 being located further away from an interior of enclosure 100 than if end portions 112, 114 were not angled outward. Locating edges 122 further away from an interior of enclosure 100 may result in the bottom corners 124 on edges 122 being in or near vertical alignment with a portion of top surface 104, despite the draft angle of walls 108. Enclosures 100 may be able to be stacked on top of one another as a result of bottom corners 124 being in or near vertical alignment with top surface 104. Enclosures 100 may be able to be stacked as long as bottom corners 124 are vertically aligned with some portion of top surface 104, such as an inside ledge 126 (see FIG. 5) of top opening 110. The angle and size of end portions 112, 114 may be varied in order to adjust the location of edges 122 and bottom corners 124.

Figure 5:
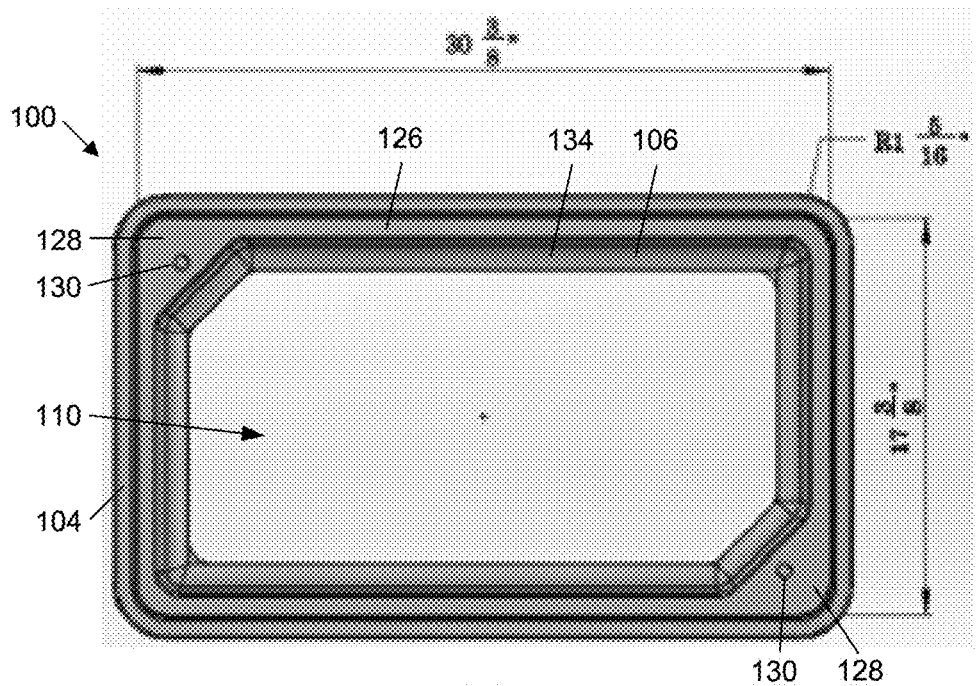
FIG. 5 is a top view of an enclosure according to another embodiment of this disclosure.
Figure 6:
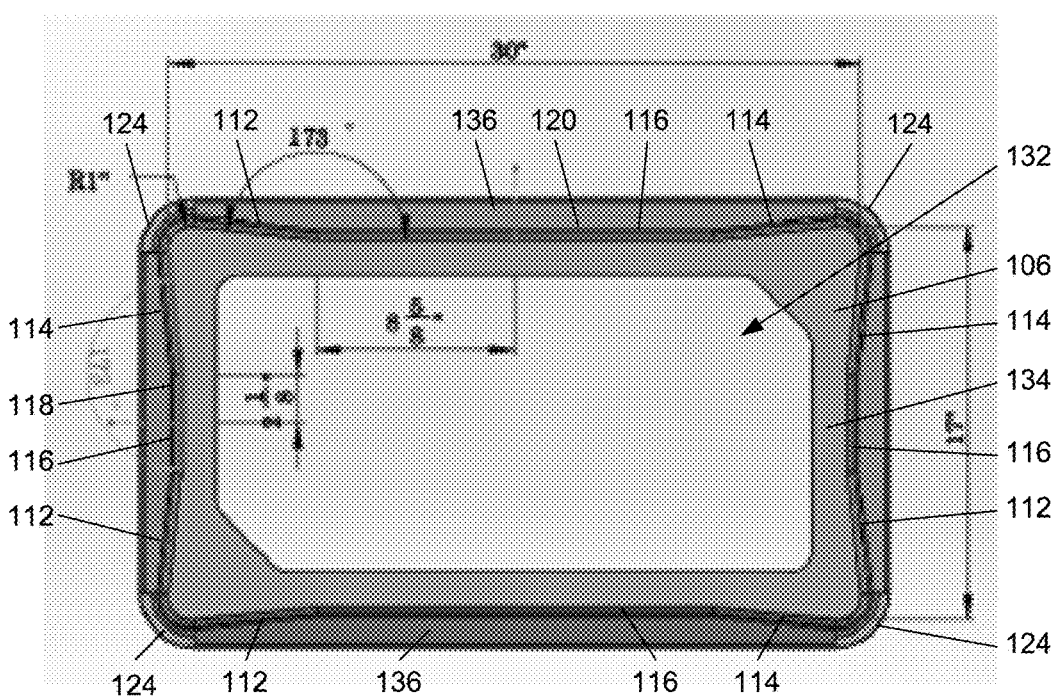
FIG. 6 is a bottom view of the enclosure according to another embodiment of this disclosure.

FIG. 5 is a top view of an embodiment of an enclosure 100. The dimensions shown in FIGS. 5 and 6 are in inch units and are exemplary. Enclosure 100 may include top surface 104 and top opening 110. An interior portion of bottom surface 106 may be seen through top opening 110. Top surface 104 may include inside ledge 126. Inside ledge 126 may be recessed from the remainder of top surface 104. Inside ledge 126 may create a support surface for lid 102, as shown in the top enclosure 100 in FIG. 4. Inside ledge 126 may also create a support surface for another enclosure 100 when enclosures 100 are stacked, as shown in the bottom enclosure 100 in FIG. 4. Excluding inside ledge 126, the top openings 110 may be 30⅜" by 17⅜", as shown in FIG. 5.

Inside ledge 126 may not be uniform across the top of enclosure 100 and may include expanded corners 128, such as the opposite corners shown in FIG. 5. The expanded corners 128 may include holes 130 designed to allow bolts (not shown) to secure lid 102 to enclosure 100. Retaining nuts (not shown) to secure the bolts may be contained within holes 130. Edges 122 may be rounded to include a radius, such as 5/16" as shown in FIG. 5.

FIG. 6 is a bottom view of an embodiment of an enclosure 100. Enclosure 100 may include bottom surface 106 and bottom opening 132. Bottom surface 106 may include a foot 134 that extends from the outside edge of bottom surface 106 toward the bottom opening 132. The bottom of foot 134 is shown in FIG. 6, while the top of foot 134 is shown in FIG. 5. Foot 134 may extend further into bottom opening 132 in the corners adjacent to expanded corners 128.

FIG. 6 shows that end portions 112, 114 may be angled with respect to the middle portions 116. For example, FIG. 6 shows that first end portion 112 of sidewall 120 is disposed at a 173 degree angle with respect to middle portion 116 of sidewall 120. Similarly, second end portion 114 of end wall 118 is disposed at a 173 degree angle with respect to middle portion 116 of end wall 118.

FIG. 6 shows that bottom corners 124 are located further away from an interior of bottom opening 132 than the middle portions 116 as a result of end portions 112, 114 being angled with respect to the middle portions 116. The location of bottom corners 124 allows enclosures 100 to be stacked on top of one another because bottom corners 124 are in or near vertical alignment with top surface 104. For example, FIG. 6 shows that the bottom corners are approximately 30" apart along sidewall 120, whereas the top opening 110 excluding inside ledge 126 is 30⅜" wide, which shows that bottom corners 124 will rest on inside ledge 126 as long as inside ledge 126 is wider than ⅜". Several enclosures 100 may be stacked on top of one another, regardless of the depth of the enclosures 100.

Enclosure 100 may include an overhang 136 on the underside of top surface 104, as shown in FIG. 6. Overhang 136 may be larger in the vicinity of middle portions 116 and smaller in the vicinity of end portions 112, 114 as a result of the outward angle of end portions 112, 114.

While several embodiments of enclosures have been described, it should be understood that the enclosures are not so limited, and modifications may be made without departing from the disclosures herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the enclosures, and it is not necessarily expected that all of the described advantages will be achieved with every embodiment of the enclosures. The scope of the disclosure is defined by the appended claims, and all devices and methods that come within the meaning of the claims, either literally or by equivalence, are intended to be embraced therein.

The invention claimed is:

1. An enclosure comprising:
   a top surface;
   a bottom surface; and
   a plurality of walls connecting the top surface and bottom surface, wherein the plurality of walls includes a first wall and a second wall,
   wherein the first wall and second wall each have a first end, a second end, and a middle adjacent to the first end and the second end,
   wherein a portion of the first end of the first wall is disposed outwardly at a first horizontal angle with respect to the middle of the first wall,
   wherein a portion of the second end of the second wall is disposed outwardly at a second horizontal angle with respect to the middle of the second wall;
   wherein the plurality of walls are orientated at draft angles relative to the top surface.

2. The enclosure of claim 1, wherein the bottom surface includes a bottom opening.

3. The enclosure of claim 2, wherein the bottom surface includes a foot that extends toward the bottom opening.

4. The enclosure of claim 2, wherein the top surface includes a top opening, wherein the area of the top opening is larger than the area of the bottom opening.

5. The enclosure of claim 1, wherein the first angle is the same as the second angle.

6. The enclosure of claim 1, wherein the first angle is different than the second angle.

7. The enclosure of claim 1, wherein the first angle and the second angle are between 170 degrees and 175 degrees.

8. The enclosure of claim 1, further comprising a ledge recessed in the top surface, wherein the ledge is adjacent to the top opening.

9. The enclosure of claim 8, wherein the ledge is configured to support a portion of the bottom of a second enclosure when the second enclosure is stacked on the enclosure.

10. The enclosure of claim 8, wherein the ledge is configured to support a lid.

11. The enclosure of claim 8, wherein the ledge includes a plurality of expanded corners.

12. The enclosure of claim 11, wherein the plurality of expanded corners are located diagonally opposite from one another.

13. The enclosure of claim 1, wherein the draft angle varies within each wall.

14. The enclosure of claim 13, wherein the draft angle at the middle of each wall is different than the draft angle at the first end or second end of each wall.

15. The enclosure of claim 1, further comprising a lid.

16. The enclosure of claim 1, wherein the enclosure is a concrete underground enclosure.

17. An enclosure comprising:
- a top surface;
- a bottom surface; and
- a plurality of walls connecting the top surface and bottom surface, wherein each wall of the plurality of walls has a first end, a second end, and a middle adjacent to the first end and the second end,
- wherein a portion of the first end of each wall of the plurality of walls is disposed outwardly at a first horizontal angle with respect to the middle of the wall, and wherein a portion of the second end of each wall of the plurality of walls is disposed outwardly at a second horizontal angle with respect to the middle of the wall;
- wherein the plurality of walls connect at edges, wherein top corners are located at the edges at the top surface, wherein bottom corners are located at the edges at the bottom surface, wherein the bottom corners are vertically aligned with a portion of the top surface.

18. The enclosure of claim 17, further comprising a ledge in the top surface adjacent to the top opening, wherein the bottom corners are vertically aligned with the ledge.

19. The enclosure of claim 17, wherein the enclosure is a concrete underground enclosure.

20. The enclosure of claim 17, wherein the top surface includes a top opening; further comprising a ledge recessed in the top surface, wherein the ledge is adjacent to the top opening, wherein the ledge is configured to support a portion of the bottom of a second enclosure when the second enclosure is stacked on the enclosure.

\* \* \* \* \*